United States Patent
Choi et al.

(10) Patent No.: US 9,613,293 B2
(45) Date of Patent: Apr. 4, 2017

(54) METHOD AND APPARATUS FOR CONVERTING DEPTH IMAGE IN HIGH RESOLUTION

(71) Applicants: Ouk Choi, Gyeonggi-do (KR); Do Kyoon Kim, Gyeonggi-do (KR); Kee Chang Lee, Gyeonggi-do (KR)

(72) Inventors: Ouk Choi, Gyeonggi-do (KR); Do Kyoon Kim, Gyeonggi-do (KR); Kee Chang Lee, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 212 days.

(21) Appl. No.: 14/361,467

(22) PCT Filed: Nov. 29, 2012

(86) PCT No.: PCT/KR2012/010206
§ 371 (c)(1),
(2) Date: Oct. 14, 2014

(87) PCT Pub. No.: WO2013/081383
PCT Pub. Date: Jun. 6, 2013

(65) Prior Publication Data
US 2015/0036926 A1 Feb. 5, 2015

(30) Foreign Application Priority Data

Nov. 29, 2011 (KR) .......................... 10-2011-0126074
Nov. 28, 2012 (KR) .......................... 10-2012-0136381

(51) Int. Cl.
*G06K 9/00* (2006.01)
*G06K 9/62* (2006.01)
(Continued)

(52) U.S. Cl.
CPC .............. *G06K 9/6201* (2013.01); *G06T 5/00* (2013.01); *G06T 5/003* (2013.01); *G06T 5/50* (2013.01);
(Continued)

(58) Field of Classification Search
CPC ........... H04N 13/0271; H04N 13/0239; H04N 2013/0081; H04N 2013/003; G06T 5/003;
(Continued)

(56) References Cited

U.S. PATENT DOCUMENTS

2006/0034512 A1* 2/2006 Sheraizin ............... H04N 1/628
382/173
2009/0213240 A1* 8/2009 Sim ......................... G06T 17/00
348/222.1
(Continued)

FOREIGN PATENT DOCUMENTS

JP 2009-251839 10/2009
JP 2010-140476 6/2010
(Continued)

*Primary Examiner* — Eueng-Nan Yeh
(74) *Attorney, Agent, or Firm* — Harness, Dickey & Pierce, P.L.C.

(57) ABSTRACT

Provided are a method and an apparatus for image processing. A scene includes a low resolution depth image and a high resolution color image. A depth image up-scaler up-scales the depth image using an interpolation so as to improve the resolution of the depth image. A color-depth similarity based filter removes noise from the up-scaled depth image using the color image and the up-scaled depth image. A boundary sharpening filter converts a boundary between objects in the up-scaled depth image into a clearer boundary. The resolution of the depth image may increase to the level of the resolution of the color image by means of the depth image up-scaler, the color-depth similarity based filter
(Continued)

and the boundary sharpening filter, and the depth of each pixel in the depth image may be adjusted.

20 Claims, 7 Drawing Sheets

(51) Int. Cl.
    *G06T 5/00*     (2006.01)
    *G06T 7/00*     (2017.01)
    *G06T 7/40*     (2017.01)
    *G06T 5/50*     (2006.01)
    *G06K 9/46*     (2006.01)

(52) U.S. Cl.
    CPC ............ *G06T 7/0051* (2013.01); *G06T 7/408* (2013.01); *G06K 2009/4666* (2013.01); *G06T 2207/10024* (2013.01); *G06T 2207/10028* (2013.01); *G06T 2207/20192* (2013.01)

(58) Field of Classification Search
    CPC ........ G06T 2207/10028; G06T 7/0051; G06K 9/20
    See application file for complete search history.

(56) References Cited

U.S. PATENT DOCUMENTS

2010/0239187 A1     9/2010    Yea et al.
2010/0315488 A1*   12/2010    Kim ..................... H04N 13/026
                                                                                            348/46

FOREIGN PATENT DOCUMENTS

| JP | 2010-218549 | 9/2010 |
| JP | 2011-004396 | 1/2011 |
| KR | 10-0342435 | 6/2002 |
| KR | 10-2009-0087638 | 8/2009 |
| KR | 10-2010-000671 | 1/2010 |
| KR | 10-2010-0050838 | 5/2010 |
| KR | 10-2011-0045650 | 5/2011 |
| KR | 10-2011-0049383 | 5/2011 |
| KR | 10-2011-0055820 | 5/2011 |

* cited by examiner

METHOD AND APPARATUS FOR CONVERTING DEPTH IMAGE IN HIGH RESOLUTION

CROSS-REFERENCE TO RELATED APPLICATIONS

This application claims the benefit of International Application No. PCT/KR012/010206, filed Nov. 29, 2012 and claims the benefit of Korean Application No. 10-2012-0136381, filed Nov. 28, 2012, and Korean Application No. 10-2011-0126074, filed Nov. 29, 2011, the disclosures of all of which are incorporated herein by reference.

BACKGROUND

1. Field

Example embodiments relate to an image processing method and apparatus, and more particularly, to a method and apparatus that converts a resolution of a depth image to match a resolution of a color image.

2. Description of the Related Art

A time-of-flight (ToF) depth camera may provide 2.5-dimensional (2.5D) depth information associated with a scene in real time. A photodiode that is utilized as a pixel of a ToF camera may have a low sensitivity. Due to the low sensitivity, a size of the pixel may need to be increased. Also, a resolution of an image provided by the TOF camera including may be reduced, due to the large-sized pixel.

In general, depth cameras may not obtain color information. Accordingly, to generate a three-dimensional (3D) model of a scene, color information may need to be obtained through use of a separate color camera. Also, a color camera and a depth camera may need to be mutually and geometrically calibrated. To maintain a viewpoint of the color camera and a viewpoint of the depth camera to be similar to one another, a separate device, for example, a beam splitter, may be required. Accordingly, a size of the camera may be increased, physically.

SUMMARY

Additional aspects and/or advantages will be set forth in part in the description which follows and, in part, will be apparent from the description, or may be learned by practice of the embodiments.

Exemplary embodiments disclose a method and an apparatus that may increase a resolution of a depth image and improve a depth of pixels in the depth image by applying depth image up-scaling, color-depth similarity-based filtering, and boundary sharpening filtering to the depth image.

Exemplary embodiments also disclose a method and an apparatus that apply hierarchical color-depth similarity-based filtering to a depth image.

The foregoing and/or other aspects are achieved by providing a method of processing a depth image and a color image associated with a scene, the method including increasing, by use of a depth image up-scaler, a resolution of the depth image by up-scaling the depth image through use of interpolation, removing, by use of a color-depth similarity-based filter, noise in the up-scaled depth image through use of the color image and the up-scaled depth image, and converting, by use of a boundary sharpening filter, a boundary between objects in the up-scaled depth image to be clear, and the resolution of the up-scaled depth image matches a resolution of the color image.

The color-depth similarity-based filter may update a depth of a target pixel in the up-scaled depth image based on similarities of neighboring pixels with respect to the target pixel and depths of the neighboring pixels.

The neighboring pixels may correspond to pixels, included in a window of which a center is the target pixel, from among pixels in the up-scaled depth image.

A similarity of a neighboring pixel with respect to the target pixel may be determined based on at least one of a difference between a color of a pixel of the color image corresponding to the neighboring pixel and a color of a pixel of the color image corresponding to the target pixel, a difference between a depth of the neighboring pixel and a depth of the target pixel, and a difference between a location of the neighboring pixel and a location of the target pixel.

The color-depth similarity-based filter may update the depth of the target pixel to a value obtained by dividing a first result value by a second result value.

The first result value may be a sum of products between the depths of the neighboring pixels and the similarities of the neighboring pixels with respect to the target pixel.

The second result value may be a sum of the similarities of the neighboring pixels with respect to the target pixel.

The pixels in the up-scaled depth image may be sequentially selected as a target pixel and updated.

A target pixel may be repeatedly updated, at least once, based on previously updated depths of the neighboring pixels.

The target pixel may be updated within a range between a minimum value and a maximum value, the minimum value being a minimum depth from among depths of the neighboring pixels before updating, and the maximum value being a maximum depth from among the depths of the neighboring pixels before updating.

The method may further include generating the color image by down-sampling an original color image associated with the scene to match the resolution of the depth image.

The increasing of the resolution, generating of the color image, and removing of noise may be repeatedly performed until the resolution of the up-scaled depth image matches a resolution of the original color image.

The converting may further include identifying a maximum depth and a minimum depth from among depths of neighboring pixels of a target pixel in the up-scaled depth image, determining whether the target pixel exists in a boundary area between objects in the depth image, and replacing the depth of the target pixel with a depth that is closer to the depth of the target pixel in the range between the maximum depth and the minimum depth when the target pixel exists in the boundary area.

The neighboring pixels may correspond to pixels, included in a window of which a center is the target pixel, from among pixels in the up-scaled depth image.

The target pixel may be determined to exist in the boundary area when a difference between the maximum depth and the minimum depth is greater than a predetermined threshold value.

The foregoing and/or other aspects are achieved by providing an apparatus for processing a depth image and a color image associated with a scene, the apparatus including a depth image up-scaler to perform up-scaling of the depth image through use of interpolation so as to increase a resolution of the depth image, a color-depth similarity-based filter to remove noise in the up-scaled depth image using the color image and the up-scaled depth image, and a boundary sharpening filter to clearly convert a boundary between objects in the up-scaled depth image, and the resolution of the up-scaled depth image matches a resolution of the color image.

The color-depth similarity-based filter may update a depth of a target pixel in the up-scaled depth image based on similarities of neighboring pixels with respect to the target pixel and depths of the neighboring pixels The target pixel may be updated within a range between a minimum value and a maximum value, the minimum value being a minimum depth from among depths of the neighboring pixels before updating, and the maximum value being a maximum depth from among the depths of the neighboring pixels before updating.

The apparatus may further include an original color image down-sampler to generate the color image by down-sampling an original color image associated with the scene to match a resolution of the depth image.

The depth image up-scaler, the original color image down-sampler, and the color-depth similarity-based filter may repeatedly operate until the resolution of the up-scaled depth image matches a resolution of the original color image.

To clearly convert the boundary between the objects in the up-scaled depth image, the boundary sharpening filter may perform identifying of a maximum depth and a minimum depth from among depths of neighboring pixels of a target pixel in the up-scaled depth image, determining of whether the target pixel exists in a boundary area between objects in the depth image, and replacing of the depth of the target pixel with a depth that is closer to the depth of the target pixel from among the maximum depth and the minimum depth when the target pixel exists in the boundary area.

The boundary sharpening filter may determine that the target pixel exists in the boundary area when a difference between the maximum depth and the minimum depth is greater than a predetermined threshold value.

Disclosed herein are a method and an apparatus that may increase a resolution of a depth image and improve a depth of pixels in the depth image by applying depth image up-scaling, color-depth similarity-based filtering, and boundary sharpening filtering to the depth image.

Disclosed herein are a method and an apparatus that apply hierarchical color-depth similarity-based filtering to a depth image.

The foregoing and/or other aspects are achieved by providing a method including increasing a depth image resolution of a depth image to match a color image resolution of a two dimensional color image of a same scene, removing noise in the depth image, sharpening a boundary of an object in the depth image and generating a three dimensional color model of the scene using the depth image and the two dimensional color image, where the sharpening adjusts a pixel depth of a boundary pixel to a closest one of a maximum and a minimum pixel depth of neighboring pixels in the boundary.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
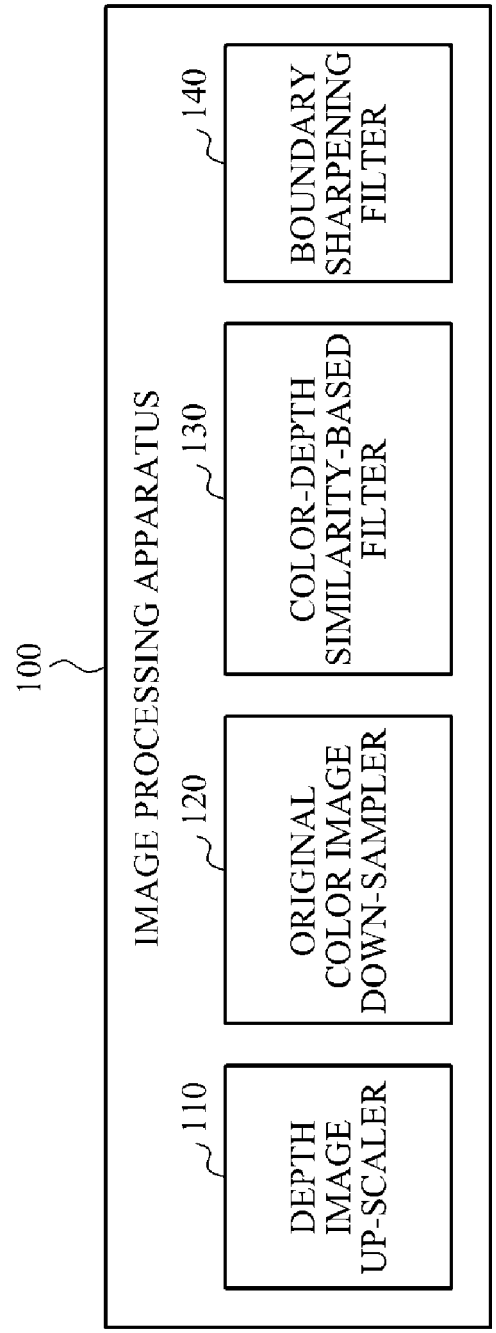
FIG. 1 illustrates a configuration of an image processing apparatus according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

A scene may be expressed by a depth image and a color image. The depth image may include at least one pixel. Each pixel of the depth image may have a depth or a value indicating a depth. The color image may include at least one pixel. Each pixel of the color image may include a color or a value indicating a color. Hereinafter, a depth and a value indicating a depth may be directed to the same meaning. For example, updating of a depth of a pixel may indicate changing of a value of the depth of the pixel. Updating of a depth of a pixel to a different depth may indicate changing of the depth of the pixel to the different value.

A predetermined pixel of the depth image and a predetermined pixel of the color image may indicate the same area or the same point in the scene. The predetermined pixel of the depth image may correspond to the predetermined pixel of the color image. When a resolution of the depth image is different from a resolution of the color image, there may be an n:m relation between pixels of the depth image and pixels of the color image. Here, n and m may be natural numbers, respectively. Based on characteristics of a color-depth camera, the depth image may have a relatively low resolution, and the color image may have a relatively high resolution.

There may be a de-correlation between a depth of a pixel and a disparity of a pixel. Accordingly, a depth may be replaced with a disparity or an inverse disparity. Also, a view and a scene may be directed to the same meaning and may be replaced by one another.

To enable a single camera to perform functions of a depth camera and a color camera, a single sensor, for example, a photodiode, may sense an infrared (IR) light irradiated to measure a depth and a visible light irradiated to measure a color. The camera capable of sensing a color and a depth of a scene at an identical viewpoint is referred to as a color-depth camera.

FIG. 1 illustrates a configuration of an image processing apparatus 100 according to example embodiments.

The image processing apparatus 100 may process a depth image and a color image associated with a scene. The image processing apparatus 100 may convert the depth image into a high-resolution depth image to match a resolution of the color image.

The image processing apparatus 100 may include a depth image up-scaler 110, an original color image down-sampler 120, a color-depth similarity-based filter 130, and a boundary sharpening filter 140.

Functions of the elements will be described in detail with reference to FIGS. 2 through 7.

Figure 2:
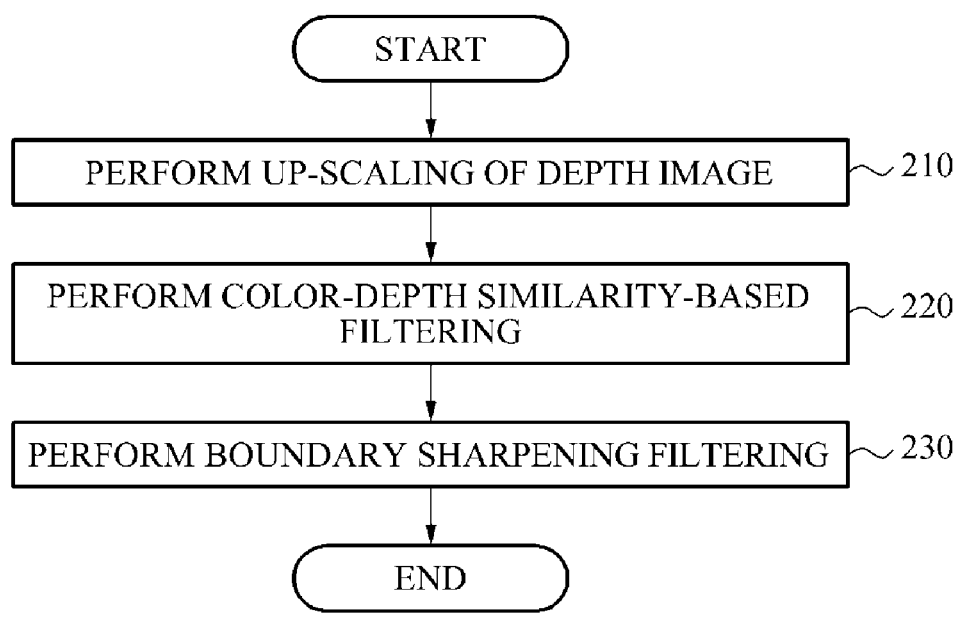
FIG. 2 illustrates a flowchart of an image processing method according to example embodiments.

FIG. 2 illustrates a flowchart of an image processing method according to example embodiments.

A depth image and a color image associated with a scene may be processed through operations 210, 220, and 230. A resolution of the depth image may be lower than a resolution of the color image, and the depth image may be converted into a high-resolution image to match a resolution of the color image through operations 210, 220, and 230.

In operation 210, the depth image up-scaler 110 may increase the resolution of the depth image by up-scaling the depth image through use of interpolation. The interpolation may be a bilinear interpolation or a bicubic interpolation.

A resolution of the up-scaled depth image may match the resolution of the color image.

In operation 220, the color-depth similarity-based filter 130 may remove noise from the up-scaled depth image, through use of the color image and the up-scaled depth image. That is, noise may be removed from the up-scaled depth image by the color-depth similarity-based filter 130 that performs color-depth similarity-based filtering using the color image and the up-scaled depth image. Also, a depth of a boundary between objects in the depth image may be more accurately converted through the color-depth similarity-based filtering.

In the up-scaled depth image generated through the interpolation, a depth of a pixel corresponding to a boundary between objects may be generated by mixing a depth of a foreground object and a depth of a background. Accordingly, the depth of the pixel corresponding to the boundary between the objects may have a wrong value.

The color-depth similarity-based filter 130 may perform filtering under an assumption that depths of two neighboring pixels at a high resolution are similar to one another when the two neighboring pixels have similar colors and depths of the two pixels generated by interpolation are similar to one another.

An object may indicate a foreground object and a background or a background object.

The expression that a depth is accurate may signify that a depth of a pixel of the depth image may more accurately indicate a location of a subject indicated by the pixel.

In operation 230, the boundary sharpening filter 140 may more clearly convert the boundary between objects in the up-scaled depth image. That is, a sharpness of a depth edge in the boundary between objects in the up-scaled depth image may increase through boundary sharpening filtering performed by the boundary sharpening filter 140.

Figure 3:
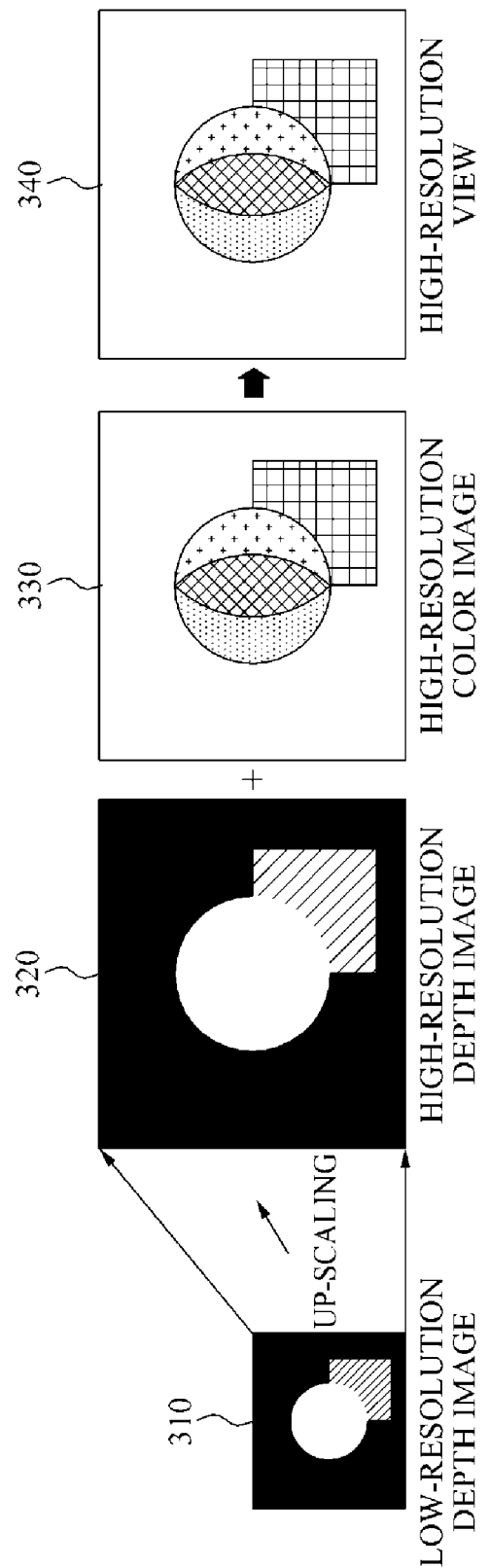
FIG. 3 illustrates a low-resolution depth image, a high-resolution depth image, and a high-resolution color image according to example embodiments.

FIG. 3 illustrates a low-resolution depth image 310, a high-resolution depth image 320, and a high-resolution color image 330 according to example embodiments.

The low-resolution depth image 310 may be a depth image associated with a scene before up-scaling. The high-resolution depth image 320 may be an up-scaled depth image. The high-resolution color image 330 may be a color image associated with the scene. As illustrated, a resolution of the low-resolution depth image 310 may be lower than a resolution of the high-resolution color image 330. The low resolution depth image 310 may be converted into the high-resolution depth image 320, through up-scaling.

The high-resolution depth image 320 and the high-resolution color image 330 may compose a high-resolution view 340. The high-resolution view 340 may include both color information and depth information associated with the scene, may be utilized for generating a 3D scene model, and may be utilized as an input view for generating a multi-view.

An up-scaled depth image and a color image may be input to the color-depth similarity-based filter 130.

A depth of each pixel in the up-scaled depth image may be updated by the color-depth similarity-based filter 130. A pixel of which a depth is to be updated by the color-depth similarity-based filter 130 may be referred to as a target pixel.

In the up-scaled depth image, neighboring pixels with respect to the target pixel may be defined. The neighboring pixels may indicate ambient areas of the target pixel, including the target pixel. For example, the neighboring pixels may correspond to pixels, included in a window of predetermined-sized or area of which a center is the target pixel, from among pixels in the up-scaled depth image.

The pixels in the up-scaled depth image may be sequentially selected as a target pixel and updated, by the color-depth similarity-based filter 130. Also, the color-depth similarity-based filter 130 may simultaneously update depths of a plurality target pixels in parallel.

The color-depth similarity-based filter 130 may repeatedly update, at least once, a target pixel based on previously updated depths of the neighboring pixels. That is, the color-depth similarity-based filtering with respect to the up-scaled depth image may be repeatedly performed, at least once.

The color-depth similarity-based filter 130 may update a depth of the target pixel in the up-scaled depth image based on similarities of the neighboring pixels with respect to the target pixel and depths of the neighboring pixels, based on Equation 1.

$$z_i^{(t+1)} = \frac{\sum_{j \in W_i} w_{i,j} z_j^{(t)}}{\sum_{j \in W_i} w_{i,j}} \qquad \text{[Equation 1]}$$

In Equation 1, t denotes a number of color-depth similarity-based filterings repeated, $z_i$ denotes a depth of a pixel i, and $z_j$ denotes a depth of a pixel j. The pixel i denotes a pixel selected as a target pixel. The pixel j denotes one of neighboring pixels of the pixel i. $W_i$ denotes a window of which a center is the pixel i. $W_{i,j}$ denotes a similarity between the pixel i and the pixel j. That is, $W_{i,j}$ may be a similarity of the neighboring pixel j with respect to the target pixel i.

Here, $z_j^1$ denotes a depth of the pixel j in the up-scaled depth image.

When color-depth similarity-based filtering is performed first, that is, when t=1, $z_j^2$ may be an updated depth of the pixel i. The color-depth similarity-based filter 130 may update depths of pixels in the up-scaled depth image. The updated depths may be used as the depths of the neighboring pixels for updating the depth of the target pixel when color-depth similarity-based filtering is performed again, when t=2.

As shown in Equation 1, the color-depth similarity-based filter 130 may perform a weighted-averaging operation so as to update the depths of the pixels in the up-scaled depth image. The weighted-averaging operation may refer to normalization of a sum of products between the depths of the neighboring pixels and weights of the neighboring pixels through use of a sum of the weights of the neighboring pixels. Here, the weights may be similarities of the neighboring pixels with respect to the target pixels.

That is, the color-depth similarity-based filter 130 may update the depth of the target pixel to a value obtained by dividing a first result value by a second result value. Here, the first result value may be a sum of products between the depths of the neighboring pixels and the similarities of the neighboring pixels with respect to the target pixel. The second result value may be a sum of the similarities of the neighboring pixels with respect to the target pixel.

The color-depth similarity-based filter 130 may calculate a similarity, that is, $W_{i,j}$ based on Equation 2.

$$w_{i,j} \propto \exp\left(-\frac{\|c_i - c_j\|^2}{2\sigma_c^2}\right) \exp\left(-\frac{(z_i^U - z_j^U)^2}{2\sigma_z^2}\right) \exp\left(-\frac{\|p_i - p_j\|^2}{2\sigma_p^2}\right) \quad \text{[Equation 2]}$$

In Equation 2, $C_i$ denotes a color of the pixel i or a color of a pixel i' of the color image corresponding to the pixel i. $C_j$ denotes a color of the pixel j or a color of a pixel j' of the color image corresponding to the pixel j. $z_i^u$ denotes a depth of the pixel i. $z_j^u$ denotes a depth of the pixel j. $P_i$ denotes a location of the pixel i in the up-scaled depth image. $P_j$ denotes a location of the pixel j in the up-scaled depth image. $\sigma_c$ denotes a constant to be used for converting a difference in colors of pixels into a weight. $\sigma_z$ denotes a constant to be used for converting a difference in depths of pixels into a weight. $\sigma_p$ denotes a constant to be used for converting a difference in locations of pixels into a weight.

As shown in Equation 2, when the pixel i is a target pixel and the pixel j is a neighboring pixel, the color-depth similarity-based filter 130 may determine a similarity of the neighboring pixel with respect to the target pixel, based on at least one of a difference between a color of the neighboring pixel or a color of a pixel in the color image corresponding to the neighboring pixel and a color of the target pixel or a color of a pixel in the color image corresponding to the target pixel, a difference between a depth of the neighboring pixel and a depth of the target pixel, and a difference between a location of the neighboring pixel and a location of the target pixel.

When the color-depth similarity-based filtering is repeatedly performed, the depth of the target pixel may vary to be different from an initial depth of the target pixel in the up-scaled depth image, at an initial stage. To prevent the above described situation, the color-depth similarity-based filter 130 may apply a clipping operation, as shown in Equation 3, to the target pixel. The clipping operation may be performed every time that the color-depth similarity-based filtering is applied to the up-scaled depth image.

$$z_i^{(t+1)} = \begin{cases} \min_{j \in M_i} z_j^U & \text{if } z_i^{(t+1)} < \min_{j \in M_i} z_j^U \\ \max_{j \in M_i} z_j^U & \text{if } z_i^{(t+1)} > \max_{j \in M_i} z_j^U \\ z_i^{(t+1)} & \text{otherwise} \end{cases} \quad \text{[Equation 3]}$$

In Equation 3, t denotes a number of color-depth similarity-based filterings to be repeated. $z_j^{i+1}$ denotes an updated depth of the pixel i obtained when color-depth similarity-based filtering is repeated, t times. $z_j^{i+1}$ denotes an updated depth of the pixel j obtained when color-depth similarity-based filtering is repeated, t times. The pixel i may indicate a pixel selected as a target pixel. The pixel j may indicate one of the neighboring pixels of the pixel i. $z_i^U$ denotes a depth of the pixel j before updating. $M_i$ denotes a window of which a center is the pixel i. The depth of the pixel j before updating may indicate a depth of the pixel j when the up-scaled depth image is generated first through interpolation.

As shown in Equation 3, the color-depth similarity-based filter 130 may update the target pixel within a range between a minimum value and a maximum value. The minimum value may be a minimum depth from among depths of the neighboring pixels of the target pixel before updating. The maximum value may be a maximum depth from among the depths of the neighboring pixels of the target pixel before updating.

Although color-depth similarity-based filtering is repeatedly applied to a predetermined pixel, a depth of the predetermined pixel may be adjusted within a range between the minimum depth and a maximum depth from among depths of neighboring pixels of the predetermined pixel, through the clipping operation.

A window of the target pixel when the color-depth similarity-based filter is applied to the target pixel may be different from a window of the target pixel when the clipping operation is applied to the target pixel. Also, the neighboring pixels of the target pixel when the color-depth similarity-based filter is applied to the target pixel may be different from the neighboring pixels of the target pixel when the clipping operation is applied to the target pixel.

Figure 4:
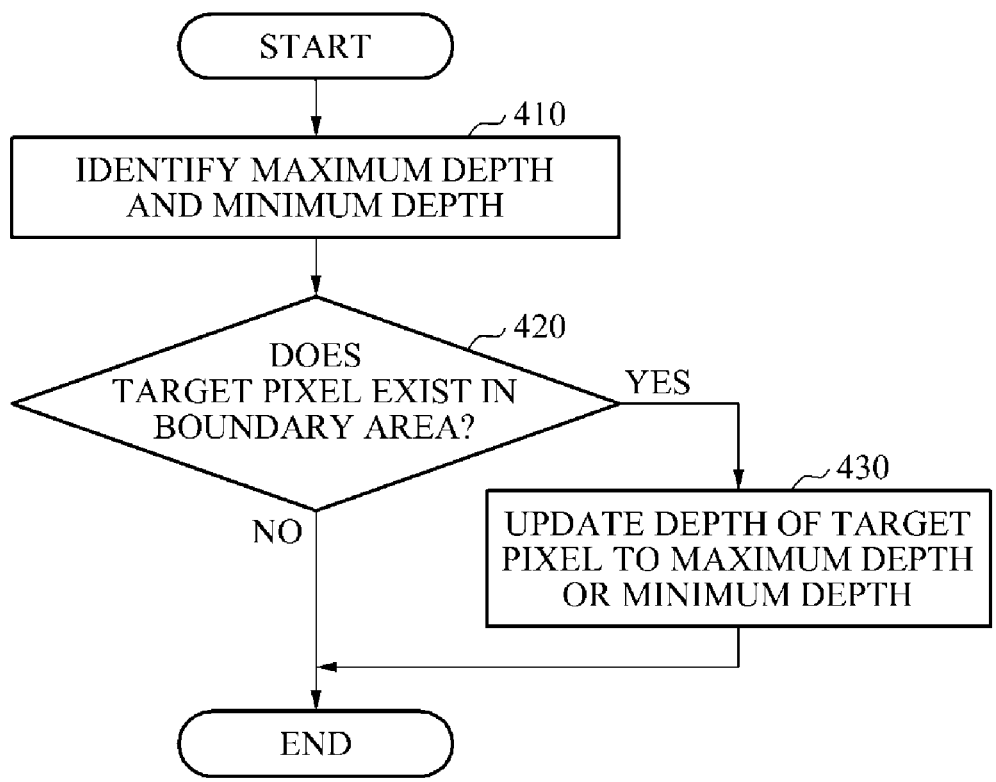
FIG. 4 illustrates a process that converts a boundary between objects in an up-scaled depth image through use of a boundary sharpening filter according to example embodiments.

FIG. 4 illustrates a process that converts a boundary between objects in an up-scaled depth image through use of the boundary sharpening filter 140 according to example embodiments.

Operations 410, 420, and 430 may be included in operation 230.

A depth of a target pixel in the up-scaled depth image may be adjusted through operations 410, 420, and 430.

Referring to Equation 2, the color-depth similarity-based filter 130 may use a weighted-averaging scheme. Instances of a weight or a similarity between two pixels being zero are non-existent. Accordingly, in a depth boundary where depths of neighboring pixels vary, a depth having an error may also be used, as a low weight, for calculating a weighted-average, in addition to an accurate depth. Accordingly, accurately estimating the depth may be difficult through use of only the boundary sharpening filter 140.

The boundary sharpening filter 140 may clearly convert the depth boundary between the objects in the up-scaled depth image, based on Equation 4.

$$z_i = \begin{cases} \min_{j \in N_i} z_j & \text{if } z_i - \min_{j \in N_i} z_j < \max_{j \in N_i} z_j - z_i \\ \max_{j \in N_i} z_j & \text{otherwise} \end{cases} \quad \text{[Equation 4]}$$

In Equation 4, $z_i$ denotes a depth of a pixel i. $z_j$ denotes a depth of a pixel j. The pixel i denotes a pixel selected as a target pixel. The pixel j may denote one of neighboring pixels of the pixel i. $N_i$ denotes a window of which a center is the pixel i.

Based on Equation 4, the boundary sharpening filter 140 may be a minimum-maximum (min-max) filter. An operation of the boundary sharpening filter 140 based on Equation 4 will be described.

In operation 410, the boundary sharpening filter 140 may identify a maximum depth and a minimum depth from among depths of neighboring pixels of a target pixel. Here, the neighboring pixels may be pixels, included in a window of which a center is the target pixel, from among pixels in the up-scaled depth image.

In operation 420, the boundary sharpening filter 140 may determine whether the target pixel exists in a boundary area between objects in a depth image. When the target pixel exists in the boundary area between the objects in the depth image, operation 430 may be performed. When the target pixel is absent in the boundary area between the objects in the depth image, the boundary sharpening filtering with respect to the target pixel may be terminated.

The boundary sharpening filter 140 may determine that the target pixel exists in the boundary area when a difference between the maximum depth and the minimum depth is greater than a predetermined threshold value.

In operation 430, when the target pixel exists in the boundary area, the boundary sharpening filter 140 may update a depth of the target pixel to the maximum depth or the minimum depth. For example, the boundary sharpening filter 140 may replace the depth of the target pixel with a depth that is closer to the depth of the target pixel from among the maximum depth and the minimum depth. When the depth of the target pixel is a mean value of the maximum depth and the minimum value, the boundary sharpening filter 140 may update the depth of the target pixel to the minimum depth or the maximum depth, based on a setting.

Figure 5:
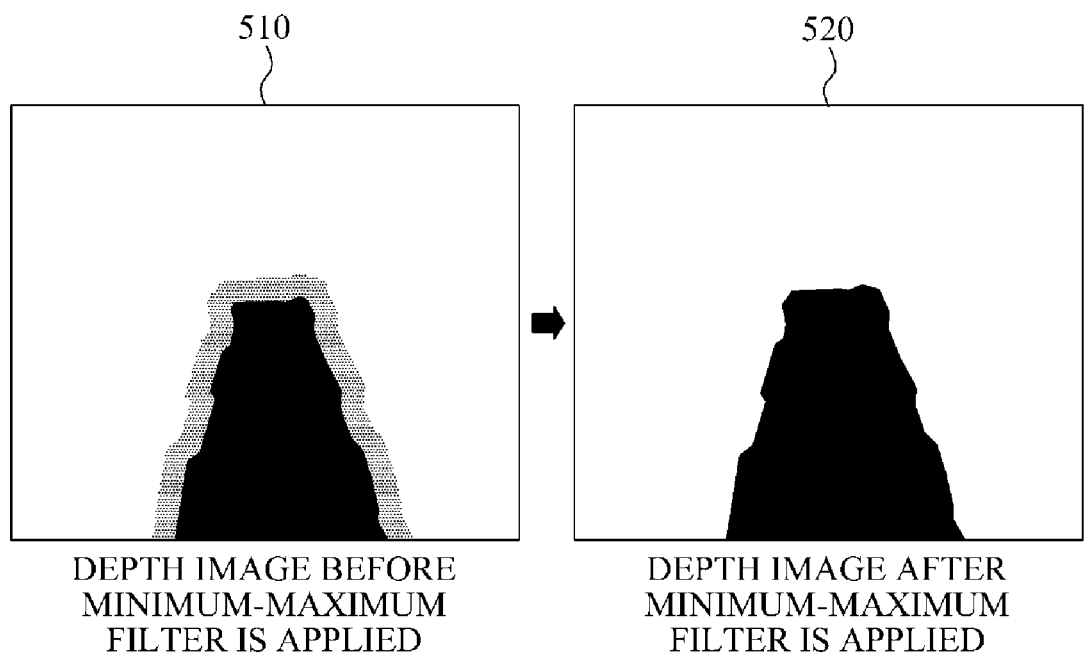
FIG. 5 illustrates a depth image before a minimum-maximum (min-max) filter is applied and a depth image after a min-max filter is applied according to example embodiments.

FIG. 5 illustrates a depth image 510 before a min-max filter is applied and a depth image 520 after the min-max filter is applied according to example embodiments.

The depth image 510 may be an up-scaled depth image obtained after color-depth similarity-based filtering is applied in operation 220.

The depth image 520 may be an up-scaled depth image obtained after a boundary sharpening filtering is applied in operation 230.

The depth image 520 may be one of data output by the image processing apparatus 100.

Figure 6:
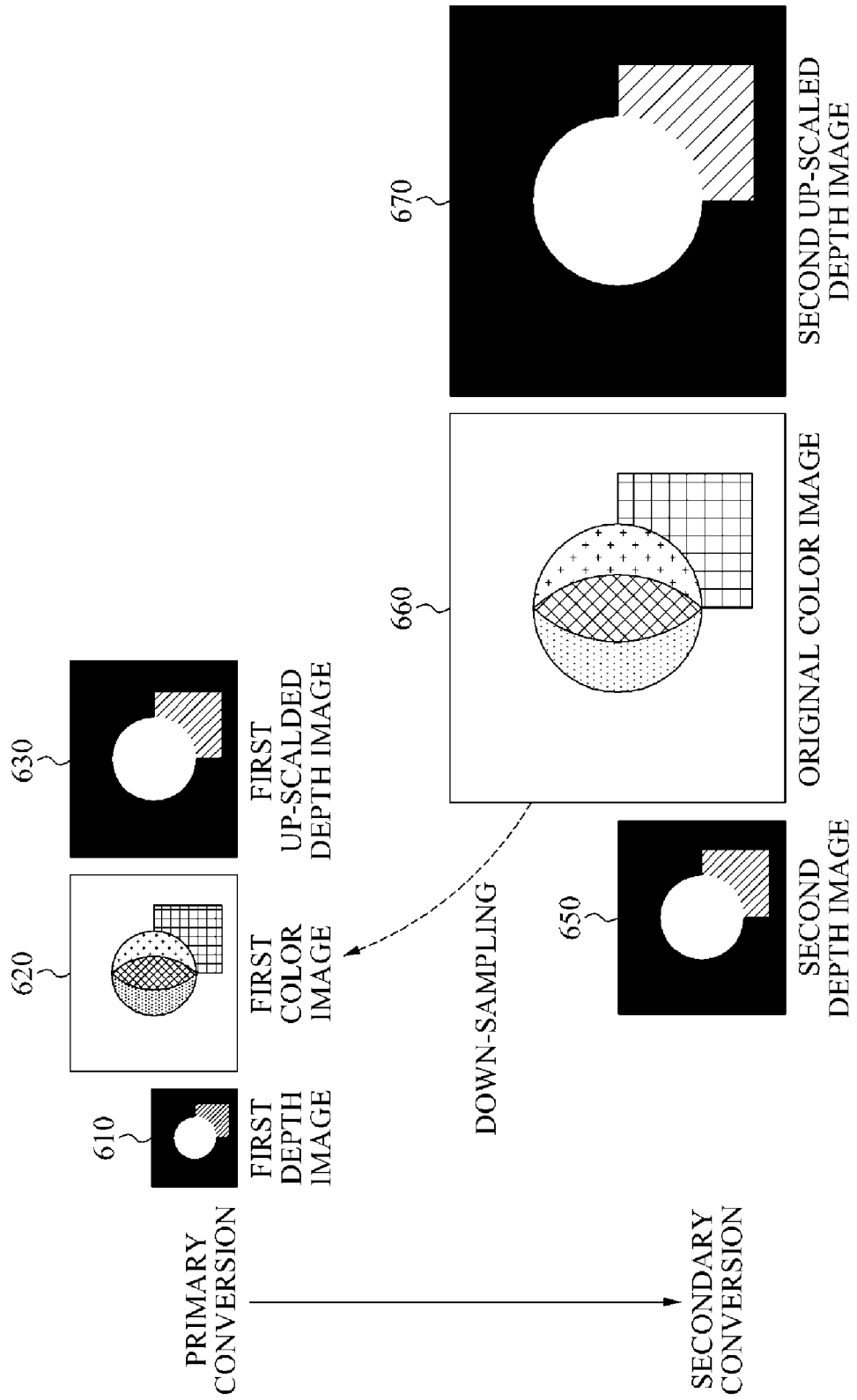
FIG. 6 illustrates a hierarchical color-depth similarity-based filtering according to example embodiments.

FIG. 6 illustrates a hierarchical color-depth similarity-based filtering according to example embodiments.

A filter that is fit to be embodied as hardware may be required to perform the same calculation with respect to a plurality of pixels so that a parallel-processing is performed, to use a small-sized window, and to be repeatedly applied a relatively small number of times. A number of hardware elements embodying the filter may be proportional to a size of the window and the number of times that the filter is repeatedly applied. Conversely, the color-depth similarity-based filter 130 may show a high performance as the size of the window is large and the number of times that the filter is repeatedly applied is relatively high. Accordingly, for trade-off between a suitability for hardware implementation and a performance of filtering, the color-depth similarity-based filter 130 may operate hierarchically.

For example, when an up-scaling ratio, used for up-scaling a resolution of a depth image to match a resolution of a color image, is 2" for a length and width, the depth image up-scaler 110 may perform, n times, an up-scaling conversion that up-scales, by twofold, a length resolution and a width resolution and thus, the resolution of the up-scaled depth image matches the resolution of the color image. In this example, when the size of the window is constantly maintained in operations 220 and 230, the window may cover a physically large area at an initial up-scaling conversion, and may cover a physically small area at a last up-scaling conversion. Accordingly, an effect equivalent to when a larger-sized window is used, on average, may be obtained.

Also, a small number of pixels may exist in an up-scaled depth image created by the initial up-scaling conversion. Accordingly, the color-depth similarity-based filter 130 may update depths of target pixels using a small amount of calculation.

To utilize a hierarchical color-depth similarity-based filtering, a color image having the same resolution as a resolution of an up-scaled depth image created during an intermediate conversion may be required. The color image may be created through down-sampling. Hereinafter, an initial color image included in a scene may be referred to as an original color image. The original color image may have a higher resolution than the depth image. The original color image down-sampler 120 may perform down-sampling of the original color image to match the resolution of the depth image and thus, the color image may be created.

The scene may include a first depth image 610 and an original color image 660 at an initial stage.

In a primary conversion, the depth image up-scaler 110 may generate a first up-scaled depth image 630 by up-scaling the first depth image 610. A resolution of the first up-scaled depth image 630 may be lower than a resolution of the original color image 660 and thus, the original color image down-sampler 120 may perform down-sampling of the original color image 660 so as to create a first color image 620. The color-depth similarity-based filter 130 may remove noise from the first up-scaled depth image 630 using the first up-scaled depth image 630 and the first color image 620. The first up-scaled depth image 630 from which noise is removed may be converted to a second depth image 650 through a secondary conversion.

In the secondary conversion, the depth image up-scaler 110 may perform up-scaling of the second depth image 650 so as to create a second up-scaled depth image 670. Since a resolution of the second up-scaled depth image 670 matches the resolution of the original color image 660, the color-depth similarity-based filter 130 may use the original color image 660, as is, as the color image. The color-depth similarity-based filter 130 may remove noise from the second up-scaled depth image 670 using the second up-scaled depth image 670 and the original color image 660. After noise is removed, the boundary sharpening filter 140 may convert or sharpen a boundary between objects in the second up-scaled depth image 670 to be clearly defined or sharpened (or more sharply defined).

Figure 7:
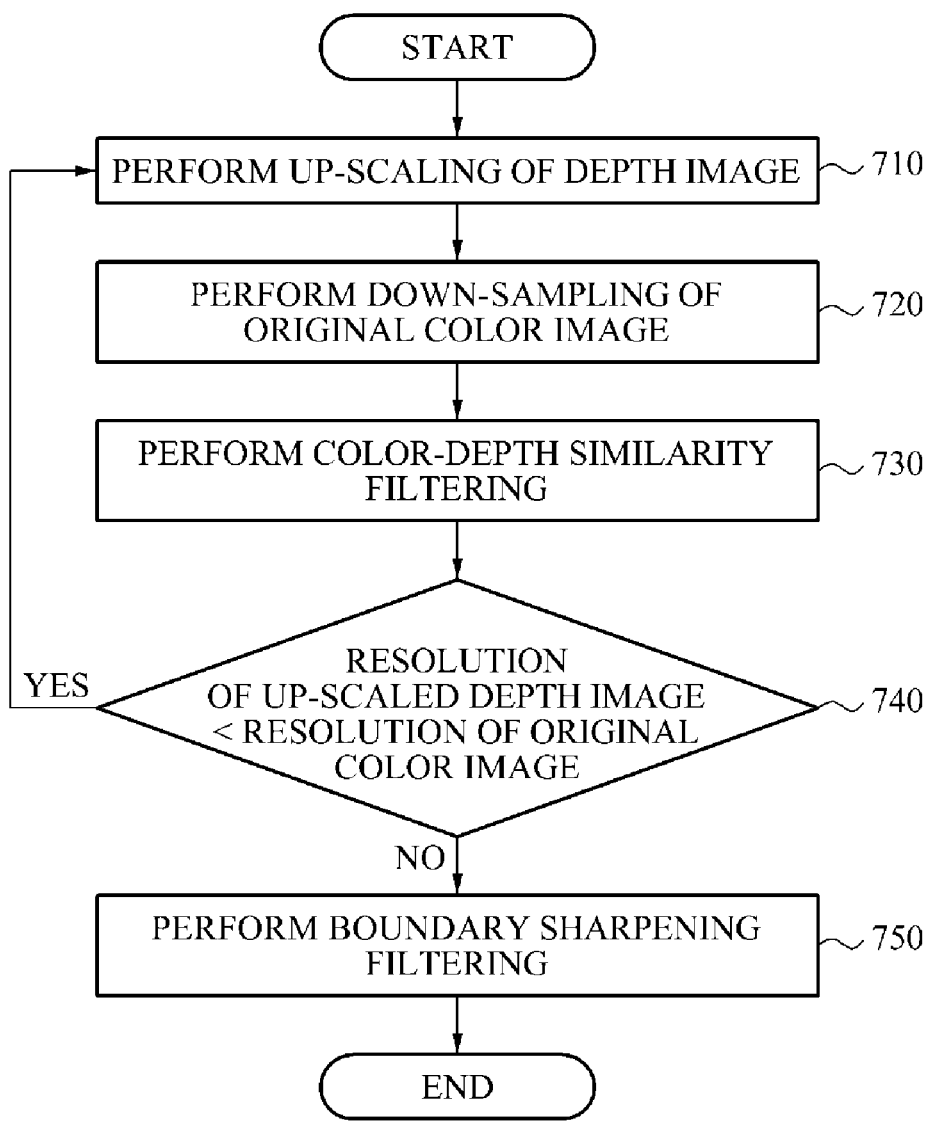
FIG. 7 illustrates a flowchart of an image processing method that applies a hierarchical color-depth similarity-based filtering according to example embodiments.

FIG. 7 illustrates a flowchart of an image processing method that applies a hierarchical color-depth similarity-based filtering according to example embodiments.

A scene may include depth information and initial image information.

Operation 710 may correspond to operation 210. Accordingly, repeated descriptions will be omitted. The depth image up-scaler 110 may perform up-scaling of a depth image through use of interpolation and thus, may increase a resolution of the depth image based on a predetermined ratio.

In operation 720, the original color image down-sampler 120 may perform down-sampling of an original color image to match the resolution of the depth image, so as to create a color image. Here, the color image may be a temporarily created image to be used when original color image down-sampling is applied to the up-scaled depth image.

Operation 730 may correspond to operation 220. Accordingly, repeated descriptions will be omitted.

In operation 740, the image processing apparatus 100 or the original color image down-sampler 120 may determine whether a resolution of the up-scaled depth image is lower than a resolution of the original color image. When the resolution of the up-scaled depth image is lower than the resolution of the original color image, the depth image may need to be up-scaled until the depth image has the same size as the original color image. Accordingly, operation 710 may be performed again. When the resolution of the up-scaled depth image matches the resolution of the original color image, the depth image may not need to be up-scaled again and thus, operation 750 may be performed. Accordingly, operations 710, 720, and 730 may be performed repeatedly until the resolution of the up-scaled depth image matches the resolution of the original color image. That is, the depth image up-scaler 110, the original color image down-sampler 120, and the color-depth similarity-based filter 130 may be operated repeatedly until the resolution of the up-scaled depth image matches the resolution of the original color image.

Operation 750 may correspond to operation 230. Accordingly, repeated descriptions will be omitted.

The embodiments described in the foregoing with reference to FIGS. 1 through 6 may be applicable to the present embodiment and thus, detailed descriptions thereof will be omitted for conciseness.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

The invention claimed is:

1. A method, comprising:
increasing, using a processor, a depth image resolution of a depth image to match a color image resolution of a two dimensional color image of a same scene and to produce an up-scaled depth image;
removing, using the processor, noise in the up-scaled depth image using the color image and the up-scaled depth image, the removing including updating a depth of a target pixel in the up-scaled depth image based on similarities of neighboring pixels with respect to the target pixel and depths of the neighboring pixel, the similarities of the neighboring pixels being based on differences in one or more attribute values between the neighboring pixels and the target pixel;
sharpening, using the processor, a boundary of an object in the up-scaled depth image from which the noise is removed to produce sharpened depth image; and
generating, using the processor, a three dimensional color model of the scene using the sharpened depth image and the two dimensional color image.

2. The method of claim 1, wherein the sharpening adjusts a pixel depth of a boundary pixel to a closest one of a maximum and a minimum pixel depth of neighboring pixels in the boundary.

3. The method of claim 1, wherein
the neighboring pixels correspond to pixels, included in a window of which a center is the target pixel, from among pixels in the up-scaled depth image, and
the differences in the one or more attribute values including at least one of,
a first difference between a color of a pixel of the color image corresponding to the neighboring pixel and a color of a pixel of the color image corresponding to the target pixel,
a second difference between a depth of the neighboring pixel and a depth of the target pixel, and
a third difference between a location of the neighboring pixel and a location of the target pixel.

4. A method of processing a depth image and a color image associated with a scene, the method comprising:
increasing, using a processor, a depth image resolution of the depth image by up-scaling the depth image using interpolation to produce an up-scaled depth image;
removing, using the processor, noise in the up-scaled depth image using the color image and the up-scaled depth image, the removing including updating a depth of a target pixel in the up-scaled depth image based on similarities of neighboring pixels with respect to the target pixel and depths of the neighboring pixels, the similarities of the neighboring pixels being based on differences in one or more attribute values between the neighboring pixels and the target pixel; and
sharpening, using the processor, a boundary between objects in the upscaled depth image from which the noise is removed,
wherein the depth image resolution of the up-scaled depth image matches a color image resolution of the color image.

5. The method of claim 4, wherein
the neighboring pixels correspond to pixels included in a window of which a center is the target pixel, from among pixels in the up-scaled depth image, and
the differences in the one or more attribute values including at least one of,
a first difference between a color of a pixel of the color image corresponding to the neighboring pixel and a color of a pixel of the color image corresponding to the target pixel,
a second difference between a depth of the neighboring pixel and a depth of the target pixel, and
a third difference between a location of the neighboring pixel and a location of the target pixel.

6. The method of claim 5, wherein the updating updates the depth of the target pixel to a value obtained by dividing a first result value by a second result value, wherein
the first result value is a sum of products of the depths of the neighboring pixels and the similarities of the neighboring pixels with respect to the target pixel, and
the second result value is a sum of the similarities of the neighboring pixels with respect to the target pixel.

7. The method of claim 5, wherein
the pixels in the up-scaled depth image are sequentially selected as the target pixel and updated, and the target pixel is repeatedly updated, at least once, based on previously updated depths of neighboring pixels.

8. The method of claim 5, wherein the updating updates the target pixel within a range between a minimum value and a maximum value, the minimum value being a minimum depth from among depths of the neighboring pixels before updating, and the maximum value being a maximum depth from among the depths of neighboring pixels before updating.

9. The method of claim 5, further comprising:
generating, using the processor, the color image by down-sampling an original color image associated with the scene to match the depth image resolution of the depth image,
wherein the increasing of the depth image resolution, the generating of the color image, and the removing of the noise are repeatedly performed until the depth image resolution of the up-scaled depth image matches an original resolution of the original color image.

10. The method of claim 4, wherein the sharpening further comprises:
identifying a maximum depth and a minimum depth from among depths of neighboring pixels of a target pixel in the up-scaled depth image;
determining whether the target pixel exists in a boundary area between objects in the up-scaled depth image; and
replacing a depth of the target pixel with a replacement depth that is closer to the depth of the target pixel between the maximum depth and the minimum depth, if the target pixel exists in the boundary area,
wherein the neighboring pixels correspond to pixels included in a window of which a center is the target pixel, from among pixels in the up-scaled depth image.

11. The method of claim 10, wherein the determining includes determining if a difference between the maximum depth and the minimum depth is greater than a threshold value.

12. A non-transitory computer-readable medium comprising computer-readable instructions for instructing a computer to perform the method of claim 4.

13. An apparatus for processing a depth image and a color image associated with a scene, the apparatus comprising:
a processor; and
a memory containing computer-readable code that, when executed by the processor, causes the processor to,
perform up-scaling of the depth image using interpolation to increase a depth image resolution of the depth image to produce an up-scaled depth image,
remove noise in the up-scaled depth image using the color image and the up-scaled depth image by updating a depth of a target pixel in the up-scaled depth image based on similarities of neighboring pixels with respect to the target pixel and depths of the neighboring pixels, the similarities of the neighboring pixels being based on differences in one or more attribute values between the neighboring pixels and the target pixel, and
sharpen a boundary between objects in the up-scaled depth image from which the noise is removed,
wherein the depth image resolution of the up-scaled depth image matches a color image resolution of the color image.

14. The apparatus of claim 13, wherein
the neighboring pixels correspond to pixels, included in a window of which a center is the target pixel, from among pixels in the up-scaled depth image, and
the differences in the one or more attribute values including at least one of,
a first difference between a color of a pixel of the color image corresponding to the neighboring pixel and a color of a pixel of the color image corresponding to the target pixel,
a second difference between a depth of the neighboring pixel and a depth of the target pixel, and
a third difference between a location of the neighboring pixel and a location of the target pixel.

15. The apparatus of claim 14, wherein the processor is configured to update the depth of the target pixel to a value obtained by dividing a first result value by a second result value,
wherein,
the first result value is a sum of products between the depths of the neighboring pixels and the similarities of the neighboring pixels with respect to the target pixel, and
the second result value is a sum of the similarities of the neighboring pixels with respect to the target pixel.

16. The apparatus of claim 14, wherein
the processor is configured to,
sequentially select the pixels in the up-scaled depth image as the target pixel and update the target pixel, and
repeatedly update the target pixel, at least once, based on previously updated depths of neighboring pixels.

17. The apparatus of claim 14, wherein the processor is configured to update the target pixel within a range between a minimum value and a maximum value, the minimum value being a minimum depth from among depths of the neighboring pixels before updating, and the maximum value being a maximum depth from among the depths of the neighboring pixels before updating.

18. The apparatus of claim 14, wherein the processor is further configured to generate the color image by down-sampling an original color image associated with the scene to match the depth image resolution of the depth image,
wherein the processor repeatedly operates until the depth image resolution of the up-scaled depth image matches an original resolution of the original color image.

19. The apparatus of claim 13, wherein, the processor is configured to sharpen the boundary between the objects by,
identifying a maximum depth and a minimum depth from among depths of neighboring pixels of a target pixel in the up-scaled depth image,
determining whether the target pixel exists in a boundary area between objects in the up-scaled depth image, and
replacing a depth of the target pixel with a replacement depth that is closer to the depth of the target pixel from among the maximum depth and the minimum depth if the target pixel exists in the boundary area, wherein
the neighboring pixels correspond to pixels, included in a window of which a center is the target pixel, from among pixels in the up-scaled depth image.

20. The apparatus of claim 19, wherein the processor is configured to determine that the target pixel exists in the boundary area if a difference between the maximum depth and the minimum depth is greater than a threshold value.

* * * * *